United States Patent
Dammann

(10) Patent No.: US 6,881,948 B2
(45) Date of Patent: *Apr. 19, 2005

(54) METHOD USING AN OPTICAL SIGNAL FOR DETECTING OVERHEATING AND FIRE CONDITIONS IN AN AIRCRAFT

(75) Inventor: Hans-Joachim Dammann, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 48 days.

This patent is subject to a terminal disclaimer.

(21) Appl. No.: 10/096,158

(22) Filed: Mar. 11, 2002

(65) Prior Publication Data

US 2002/0125414 A1 Sep. 12, 2002

(30) Foreign Application Priority Data

Mar. 10, 2001 (DE) .......................................... 101 11 640

(51) Int. Cl.$^7$ ................................................. G01J 5/08
(52) U.S. Cl. .................................. 250/227.14; 374/161
(58) Field of Search .......... 250/227.11, 227.14–227.19; 340/584, 588; 374/131, 161

(56) References Cited

U.S. PATENT DOCUMENTS

| | | | |
|---|---|---|---|
| 4,655,607 A | * | 4/1987 | Kern et al. ..................... 374/4 |
| 4,673,299 A | | 6/1987 | Dakin |
| 4,730,101 A | | 3/1988 | Mahon et al. |
| 4,767,219 A | | 8/1988 | Bibby |
| 5,028,146 A | | 7/1991 | Wada |
| 5,102,232 A | * | 4/1992 | Tanabe et al. .............. 374/131 |
| 5,178,465 A | | 1/1993 | Amano et al. |
| 5,245,401 A | * | 9/1993 | Tache et al. ................ 356/73.1 |
| 5,272,334 A | * | 12/1993 | Sai ......................... 250/227.21 |
| 5,302,025 A | | 4/1994 | Kleinerman |
| 5,306,088 A | * | 4/1994 | Zoerner ....................... 374/131 |
| 5,356,220 A | | 10/1994 | Iida et al. |
| 5,467,942 A | | 11/1995 | Abbas et al. |
| 5,765,948 A | * | 6/1998 | Sai .............................. 374/161 |
| 5,821,861 A | | 10/1998 | Hartog et al. |
| 5,825,804 A | * | 10/1998 | Sai .............................. 374/137 |
| 6,511,222 B1 | * | 1/2003 | Bouamra ..................... 374/161 |
| 6,547,435 B1 | | 4/2003 | Grosswig et al. |
| 2004/0140421 A1 | | 7/2004 | Dammann |

FOREIGN PATENT DOCUMENTS

EP 0421967 4/1991

OTHER PUBLICATIONS

U.S. Appl. No. 10/706,937, (Hans–Joachim Dammann); filed Nov. 14, 2003; 20 pages specification, claims, abstract, and 1 sheet of drawings.

* cited by examiner

Primary Examiner—Thanh X. Luu
Assistant Examiner—Stephen Yam
(74) Attorney, Agent, or Firm—W. F. Fasse; W. G. Fasse

(57) ABSTRACT

A fiber optic cable forms a temperature sensor arranged along an object or space to monitor the temperature thereof and detect overheating or fire conditions. An end of the sensor is connected through an interface to a laser emitter and an optical receiver, which are further connected to a computer. The computer controls the laser emitter to emit a laser pulse into the sensor. The optical receiver receives the resulting reflection signal from the sensor, and provides a corresponding signal to the computer to be evaluated in connection with a nominal comparison signal. If any location of the sensor is subjected to an unacceptable temperature increase, the sensor's refractive characteristics are changed, to cause an additional reflection pulse in the reflection signal. By evaluating the amplitude and the return time of the additional reflection pulse, the temperature level and the location of the overheating condition are determined by the computer.

25 Claims, 1 Drawing Sheet

METHOD USING AN OPTICAL SIGNAL FOR DETECTING OVERHEATING AND FIRE CONDITIONS IN AN AIRCRAFT

PRIORITY CLAIM

This application is based on and claims the priority under 35 U.S.C. §119 of German Patent Application 101 11 640.3, filed on Mar. 10, 2001, the entire disclosure of which is incorporated herein by reference.

FIELD OF THE INVENTION

The invention relates to a method for detecting and signaling the existence of overheating conditions and fires in an aircraft, and especially for detecting and identifying the location of an unacceptable temperature increase in a space, in a pipe or conduit, on a device, or in a pressurized or compressed air system, for example the bleed air system of which the pipes or conduits are connected to the aircraft engines for tapping hot pressurized bleed air therefrom. The temperature increase or unacceptable elevated temperature condition and its spatial location are detected by means of a sensor and the corresponding sensor signal is provided to an evaluating unit for evaluation and preferably for the generation of an alarm process and/or system switching or activation processes.

BACKGROUND INFORMATION

Modern aircraft typically include a pressurized air system that delivers hot pressurized engine bleed air for various uses within the aircraft, for example for carrying out the pressurization and air conditioning of the aircraft cabin. This hot bleed air, which reaches temperatures up to 200° C., is conveyed from the aircraft engines to the end user devices, such as air conditioning packs, in a pipe or conduit system. In the event of a rupture or leak of this pipe system, the hot pressurized air flows out of the pipe system and can damage other components or systems of the aircraft arranged near the location of the pipe rupture or leak.

In order to avoid such a dangerous problem, aircraft have typically included a monitoring system that uses sensors to detect and recognize a faulty escape of hot air from the pipe system, and uses a computer to generate warnings and/or to switch off the pressurized air supply. In order to reduce the amount of time necessary for searching for a rupture or air leak during maintenance and repair work on the rather extensive pipe system, the known monitoring systems also determine and indicate the general area or locality of the leak or overheating condition.

The sensors of the conventional overheating monitoring systems are each embodied in the form of a coaxial conductor arrangement having a respective electrical plug on each of its two ends. More particularly, the sensor includes an outer conductor embodied as a thin pipe or tube, an inner conductor embodied as a wire or the like running along in the center of the outer conductor pipe or tube, and a special salt compound pressed or enclosed in the annular space between the two conductors. At normal acceptable surrounding ambient temperatures, this salt compound acts as an electrical insulator. On the other hand, when the salt compound is heated above a prescribed temperature, the salt compound becomes electrically conductive and thus forms a low-resistance electrical path or connection between the inner and outer conductors at this overheated location. The so-called trigger temperature at which the salt compound becomes electrically conductive can be adjusted or preselected based on the composition or mixture proportions of the salt compound. Each one of these sensors is laid out along the pipeline that is to be monitored, and then connected by its electrical plugs to a computer, which evaluates the electrical data provided by the respective sensor.

In the conventional system, the computer measures the resistance between the outer conductor and the inner conductor of a respective sensor at regular time intervals. In the event a sensor, or a portion of a sensor at a particular location, overheats as a result of an unacceptable temperature increase in the area surrounding this location, the salt compound in the sensor at this location becomes electrically conductive and forms a low resistance electrical path between the inner and outer conductors at this location. As a result, the computer recognizes the low resistance of the sensor as an overheating condition and can then responsively generate an alarm indication or a switching or control signal for switching off the affected system. Furthermore, the computer can determine the location of the overheating condition by determining the resistance ratio of the inner conductor from the overheating location respectively to the two ends of the sensor.

The above described conventional system suffers at least the following disadvantages. The sensors require a rather complicated and costly manufacturing process, and also require a defined selection and setting of the desired trigger temperature during the manufacturing process. Once a sensor is manufactured, its trigger temperature is fixed. The tolerance range for the so-called trigger point or trigger temperature is relatively large, which diminishes the precision of the operation of the sensor. Since the sensors are designed and manufactured for a fixed temperature range, which is especially a rather narrow range, it becomes necessary to completely remove and exchange the sensors with different sensors if an effective temperature range of the monitoring system is to be changed. The ability to localize the area of the overheating condition using the conventional sensors in the conventional system is relatively inexact. Furthermore, the measurement signal given off by the sensor and received and evaluated by the computer must be shielded, because it is sensitive to electromagnetic interferences.

SUMMARY OF THE INVENTION

In view of the above, it is an object of the invention to provide a method of the above mentioned general type, which utilizes sensors that are relatively easy to manufacture and that provide a relatively exact measurement, for carrying out an overheating and fire monitoring in an aircraft, especially in a manner that is not subject to interference and is carried out in a continuous, seamless, or gap-free manner. The invention further aims to avoid or overcome the disadvantages of the prior art, and to achieve additional advantages, as apparent from the present specification.

The above objects have been achieved in a system and a method according to the invention having the following characterizing features. A sensor comprising an optical fiber or a fiber optic cable is arranged in direct proximity to a monitored area, e.g. along an object that is to be monitored for overheating or fire conditions, and at least one end of the sensor is connected through an interface to a laser emitter and an optical receiver, which in turn are connected to a computer. The laser source or emitter that is controlled by the computer intermittently emits short duration laser light pulses into the fiber optic cable of the sensor, and the reflection signals arising in the fiber optic cable from the reflections of the light pulses are received by the optical receiver, which preferably converts the received optical signal into a corresponding electrical signal that is transmitted to the computer. As a result, the received signals are compared, in the computer, with a prescribed threshold or a prescribed comparison signal having a reflection transit or return time that is dependent on the length of the respective fiber optic cable of the sensor.

In the event that an unacceptable temperature increase arises in or around the object to be monitored, the fiber optic cable of the sensor undergoes a temperature induced change of its refractive characteristics, and as a result generates an additional reflection pulse arising at the location of the overheating of the fiber optic cable. Thus, the reflection signal received by the optical receiver will include this additional reflection 1, pulse, which is not included in, or deviates from, the comparison signal that is stored in or provided to the computer for comparison with the actually received reflection signal. Based on the amplitude of the additional reflection pulse, the temperature level of the unacceptable temperature increase of the object is determined by the computer. Moreover, based on the reflection transit or return time of the additional reflection pulse, the computer determines the location of the unacceptable temperature increase of the object.

If the temperature level exceeds the acceptable temperature threshold, the computer triggers, generates, or releases a signal that can be further used to provide an alarm indication to the crew of the aircraft, or to activate safety measures or corrective measures such as activating a fire suppression system, or shutting down at least the affected area or component of the system being monitored.

The invention makes advantageous use of the Rayleigh effect, whereby a temperature increase will cause the optical fiber or the fiber optic cable to exhibit a different refraction characteristic at the affected location. Also, the Fresnel effect, by which a reflection pulse will be generated, is further advantageously used. Thus, in connection with the Rayleigh effect the invention can measure a temperature increase that arises at a certain location along the fiber optic cable, and in connection with the Fresnel effect, the invention can precisely determine the location of this temperature increase relative to the total length of the fiber optic cable. Alternatively, the location of the overheating condition can be determined with respect to an absolute distance of the location from one end of the cable.

With the above discussed measurement results or data, the monitoring arrangement, particularly including a computer, can advantageously carry out at least the following tasks in connection with the monitoring for overheating and fire conditions. The computer evaluates the measurement results in consideration of comparison signals or thresholds that are prescribable and adjustable, for example preferably by means of software changes.

The present inventive method can determine the occurrence of temperatures exceeding preset temperature limits along the length of the sensor, whereby different temperature limits may be specified for different portions or zones of the length of the sensor. This can be achieved by making appropriate selections or adjustments, preferably simply by software changes, of the comparison signals or thresholds to be used for evaluating the measurement data for each respective associated zone of the sensor. Namely, different temperature thresholds or limit values can be allocated respectively to different ranges of the reflection signal transit time, which in turn are respectively allocated to respective zones of the sensor.

The inventive method further can determine the duration of an overheating condition at any respective location, and can determine the temperature progression over prescribed time intervals at each respective location, by simply repeating successive cycles of the monitoring process. This enables better diagnosis of problems, and allows temporary, short-duration and thus non-critical overheating conditions to be indicated or the like, without triggering a drastic corrective measure such as shutting down the affected system or component.

Furthermore, any faulty interruption of the fiber optic cable can be detected, due to the change of the end reflection signal. The portion of the fiber optic cable between the location of the break and the interface at which the cable is connected to the computer remains fully functional and may continue to be used for carrying out the usual monitoring functions.

The inventive method may also provide an indication or display of the results determined by the computer, and/or may automatically trigger or actuate any necessary changes or manipulations of the system being monitored, for example switching off the system being monitored, or the affected portion or portions of the monitoring system, when prescribed temperature values are exceeded.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
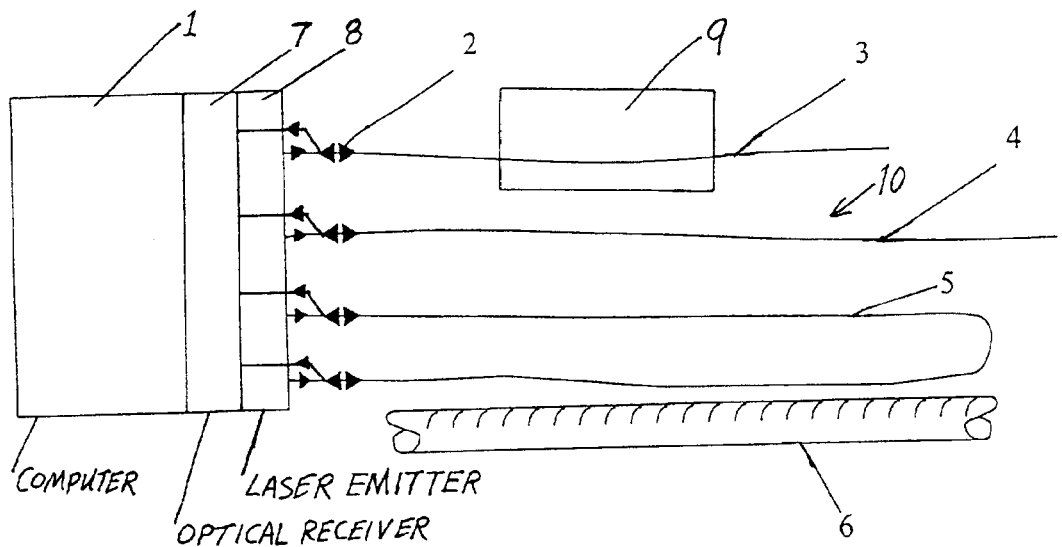
FIG. 1 is a schematic diagram of the basic components of a system for monitoring temperature conditions to detect overheating of a device, a pipe, or a space.

FIG. 1 schematically shows a general overview of a monitoring arrangement and sensors connected thereto for monitoring the temperature of a monitored area so as to detect an overheating or fire condition in the monitored area. The general term "overheating condition" includes a fire condition. The monitoring arrangement includes a computer 1 connected to an optical receiver and a laser source or emitter 8. The sensors include three representative sensors 3, 4 and 5 that are each connected via an interface 2 to the optical receiver 7 and the laser emitter 8, such that the laser emitter 8 can selectively feed a laser pulse through the respective interface 2 into the respective sensor 3, 4 and 5, and so that the optical receiver 7 can receive a return or reflection pulse from the respective sensor 3, 4 or 5 through the associated interface 2. The laser emitter 8 is connected to the computer 1 to be controlled and selectively actuated by the computer 1. The optical receiver 7 is connected to the computer 1 so as to convert the received optical reflection signals into corresponding electrical signals that it provides to the computer 1.

Each one of the sensors 3, 4 and 5 respectively comprises an optical fiber or fiber optic cable. The simplest embodiment of the fiber optic cable is understood to cover simply a single optical fiber, but may further refer to an optical fiber covered by a sheath, a bundle of optical fibers covered by a sheath, or even a bundle of individually sheathed fibers. The term "fiber optic cable" will be used generally herein to refer to any one of such arrangements. The optical fiber or fibers in a fiber optic cable may each be a glass fiber or an optical fiber of any other known material that is suitable for conducting a light signal therealong. The particular material may be selected according to the invention to provide the desired refractive characteristics in the required temperature range. The characteristics of a compound fiber including an inner core and a cladding layer, as well as the characteristics of the sheath, must also be taken into consideration.

The respective fiber optic cable of the two sensors 3 and 4 is connected at only one of its ends through an interface 2 to the monitoring arrangement, i.e. the optical receiver 7 and the laser emitter 8, and thereby also to the computer 1. On the other hand, the fiber optic cable of the sensor 5 is laid out as a loop, whereby both of its ends are connected through respective interfaces 2 to the optical receiver 7 and the laser emitter 8. The sensors 3, 4, and 5 are laid out in the aircraft so as to monitor the desired monitored area, respectively. For example, the sensor 3 is laid out along a device 9 that is to be monitored for its temperature conditions, i.e. for overheating or fire conditions. Such a device may, for example, be any electrical or electronic device, a turbo machine, a fuel tank, or any other device in an aircraft in which the temperature is to be monitored. The sensor 4 is arranged to extend through a space 10 that is to be monitored, which may, for example, be a cargo or baggage hold space, a confined space within a wing, or other spaces within the aircraft of which the temperature is to be monitored. The looped sensor 5 is arranged to extend along a pipe or conduit 6, which is, for example, a component of the hot pressurized bleed air system in the aircraft.

In order to detect any unacceptable temperature increase in any one of the monitored areas, i.e. the monitored device 9, the monitored space 10, or the monitored pipe or conduit 6, the invention makes use of the Rayleigh effect. Namely, the temperature-dependent Rayleigh scattering of a light pulse traveling along the respective fiber optic cable of the respective sensor 3, 4, or 5 will cause a corresponding characteristic temperature-dependent return or reflection pulse that can be detected by the optical receiver 7. In this case, the temperature dependence of the refractive characteristics of the fiber optic cable is used for being able to identify the temperature to which any given location along the fiber optic cable of the respective sensor 3, 4, or 5 is being subjected.

Moreover, through the use of the Fresnel effect, the length of the fiber optic cables of the sensors 3, 4 and 5 can be determined. Namely, the Fresnel reflection at the free end of the fiber optic cable, of an input light pulse traveling along the fiber optic cable of the respective sensor 3, 4, or 5, will return to the monitoring arrangement with a reflection transit or return time, which is the time between the introduction of the input light pulse into the fiber optic cable and the reception of the reflection pulse, respectively at the end of the fiber optic cable connected to the interface. Since this reflection transit time is directly dependent on the length of the fiber optic cable (in consideration of the speed of light traveling in the medium of the fiber optic cable), it can thus be used for the computational determination of the length of the respective sensor.

The above signal evaluations are carried out as follows. The computer 1 selectively actuates the laser emitter 8 so as to emit and feed a light pulse into the respective fiber optic cable of the respective sensor, e.g. sensor 3. The optical receiver 7 then receives the optical signal that is reflected from the fiber optic cable of the sensor 3 back through the interface 2 to the optical receiver 7, and converts this received optical reflection signal into a corresponding electrical signal that is provided to the computer 1 for evaluation. A main internal reflection will arise in the fiber optic cable, and an additional Fresnel reflection will arise from the free end of the fiber optic cable of the sensor 3, as mentioned above.

The computer 1 measures the respective reflection transit times. The computer uses the reflection transit or return time of the additional Fresnel reflection to calculate the length of the respective sensor 3, i.e. of the fiber optic cable. In this manner, if the fiber optic cable of the sensor 3 is damaged or broken, this will be immediately detected by the corresponding change of the apparent length of the fiber optic cable as determined from the reflection transit time of the additional Fresnel reflection. The location of the break or damage, which causes a significant change of the refractive characteristics of the fiber optic cable at this location, can thus also be determined from the new calculation of the apparent remaining length of the fiber optic cable.

In each case, the optical reflection signal is received by the optical receiver 7, which in turn provides a corresponding electrical signal to the computer 1 for evaluation. The computer evaluates both the amplitude of the received reflection signal, as well as the time between the sending or emitting of the respective laser pulse by the laser emitter 8 and the reception of the reflected signal by the optical receiver 7. The computer 1 may further evaluate the wave form, such as the pulse width of the reflection signal pulses. These measured or evaluated signal values are then compared by the computer 1 with prescribed comparison signals or thresholds that are stored in or provided to the computer 1, whereby the computer 1 then determines the desired physical values such as the temperature increase, i.e. the elevated temperature level, from the signal amplitude, and the spatial location of the overheating condition along the fiber optic cable of the respective sensor 3, from the reflection transit time of the associated reflection pulse.

The looped sensor 5 can use the transit time of the main laser pulse from one end of the fiber optic cable to the other, instead of the transit or return time of a reflection signal arising from the end reflection of this pulse, to determine the total length of the sensor. If any one of the sensors is broken or interrupted, the portion thereof between the damage location and the end connected to the monitoring arrangement remains fully functional for its intended purposes of sensing overheating conditions. In the looped configuration of the sensor 5, the entire sensor 5 can still remain operational after it is damaged, if it is, in effect, operated as two sensors of the free-ended configuration represented by the sensors 3 and 4. Namely, after the looped sensor 5 is broken into two free-ended sensors, each of these remaining sensor portions is operated as an independent sensor through the respective interface 2 at its end connected to the laser emitter 8 and optical receiver 7.

Figure 2A:
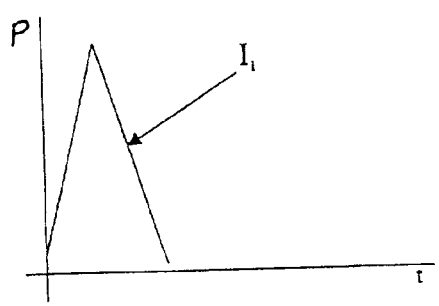
FIG. 2A is a schematic power versus time diagram representing an input light pulse that is fed into a fiber optic cable.
Figure 2B:
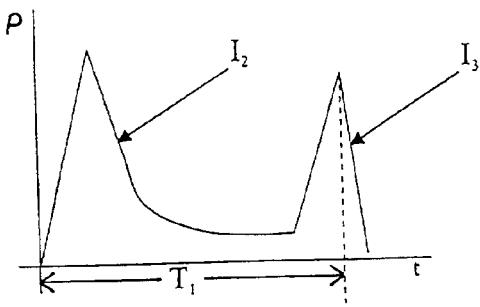
FIG. 2B is a schematic power versus time diagram representing a reflection signal arising from the reflection of the input light pulse according to FIG. 2A in the fiber optic cable.

The diagram of FIG. 2A shows the time progression of the signal strength or power of a laser light pulse, e.g. represented as a triangular pulse $I_1$, that is emitted and fed by the laser emitter into the respective fiber optic cable. Next, FIG. 2B shows the time progression of the signal strength or power of the reflection signal, associated with the input signal $I_1$, as this reflection signal is received by the optical receiver 7. An electrical signal corresponding to this optical reflection signal is then used and evaluated in the computer 1. Particularly, when the respective sensor is known to be operating without a fault or defect, and is also not experiencing an overheating condition, the reflection signal shown in FIG. 2B can be used by the computer as a baseline nominal calibration signal or comparison signal, to which later reflection signals will be compared to evaluate whether an overheating condition or a fault exists.

FIG. 2B shows that the reflection signal includes a main reflected pulse $I_2$ and an additional reflection pulse $I_3$ that results from the Fresnel reflection at the free end of the respective sensor. The time duration $T_1$ of the transit or return time of the Fresnel reflection pulse $I_3$ is a measure of the length of the corresponding fiber optic cable as described above.

Figure 3A:
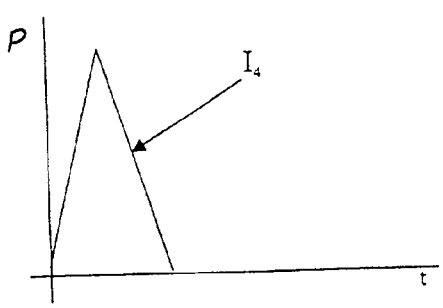
FIG. 3A is a schematic power versus time diagram representing an input light pulse that is fed into a fiber optic cable.
Figure 3B:
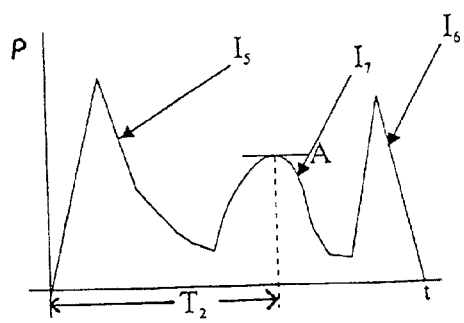
FIG. 3B is a schematic power versus time diagram representing a reflection signal arising from the reflection of an input light pulse according to FIG. 3A in the fiber optic cable, including an additional Rayleigh reflection signal caused by a local temperature increase.

FIG. 3A shows the time progression of a further input light pulse fed by the laser emitter 8 into the respective sensor. In this case (FIGS. 3A and 3B), the fiber optic cable of this sensor runs through an area exhibiting an unacceptable excessive local temperature increase. The signal time progression of the associated reflection signal is shown in FIG. 3B. The signal progression of this reflection signal distinguishes itself from the "normal condition" signal shown in FIG. 2B, in that it comprises a further reflection pulse 17 in addition to the main reflection pulse $I_5$ and the Fresnel reflection pulse 16.

This further reflection pulse 17 results from an increased local Rayleigh scattering and reflection within the fiber optic cable at the location of the unacceptable high temperature. This increased local reflection is caused by the temperature-dependent refractive characteristics of the fiber optic cable, whereby the amplitude A of this reflection pulse 17 is dependent on the magnitude of the temperature, and results from and may be measured in connection with the Rayleigh effect. Thus, the signal amplitude A can be evaluated to determine the temperature existing at the given overheating location. Moreover, the spatial position of this overheating location can be determined by evaluating the signal transit or return time $T_2$ for the reception of the pulse $I_7$. This return time $T_2$ which may be evaluated similarly to the Fresnel reflection return time $T_1$ as described above, and may be used either directly or in relation to the time $T_1$, to determine the length of the cable up to the point of the overheating location, or correspondingly the spatial position of this overheating location. This information can be suitably indicated to the flight crew or maintenance personnel by a corresponding display or read-out from the computer 1.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In an aircraft including a hot engine bleed air system with a bleed air pipe, a temperature sensor arranged proximate to said bleed air pipe, and a monitoring arrangement that includes a computer and that is connected to said temperature sensor so as to receive and evaluate signals therefrom, an improvement wherein:

said temperature sensor comprises a fiber optic cable that is arranged to extend along said bleed air pipe and that includes plural sensor zones along said fiber optic cable;

said monitoring arrangement further includes a laser emitter connected to said computer to be controlled by said computer, and an optical receiver connected to said computer to provide a receiver signal thereto;

said laser emitter is further connected to a first end of said fiber optic cable so as to transmit a laser input pulse from said laser emitter into said fiber optic cable;

said optical receiver is further connected to said first end of said fiber optic cable so that said optical receiver receives from said fiber optic cable a reflection signal including a temperature-dependent reflection pulse that arises from at least one reflection of said input pulse in said fiber optic cable;

said reflection signal exhibits an amplitude and a reflection transit time of said temperature-dependent reflection pulse;

said optical receiver produces said receiver signal in response to and dependent on said reflection signal so that said receiver signal represents said amplitude and said reflection transit time;

said computer is adapted and programmed to allocate respective different transit time ranges individually to said plural sensors zones, and to allocate respective different amplitude limits representing different temperature limits individually to said plural sensor zones; and said computer is further adapted and programmed to evaluate said receiver signal so as to determine a location of a bleed air leak from said bleed air pipe as falling into a particular one of said plural sensor zones by determining into which one of said transit time ranges said reflection transit time falls; and said computer is further adapted and programmed to evaluate said receiver signal so as to determine an existence of said bleed air leak by comparing said amplitude to a particular one of said amplitude limits that is allocated to said particular one of said sensor zones.

2. The improvement in the aircraft according to claim 1, wherein said fiber optic cable is arranged as a loop, and a second end of said fiber optic cable opposite said first end is additionally connected to said laser emitter and to said optical receiver.

3. The improvement in the aircraft according to claim 1, wherein a second end of said fiber optic cable opposite said first end is a free termination end that is not connected to said laser emitter and is not connected to said optical receiver.

4. The improvement in the aircraft according to claim 1, wherein said temperature sensor consists essentially of said fiber optic cable.

5. A method of detecting and locating a bleed air leak from a bleed air pipe in a hot engine bleed air system in an aircraft, using a temperature sensor including a fiber optic cable extending along said bleed air pipe, said method comprising the following steps:

a) subjecting said fiber optic cable to a temperature condition existing along said bleed air pipe, in which said temperature condition exhibits an elevated temperature if bleed air leaks from said bleed air pipe;

b) introducing an input light pulse into a first end of said fiber optic cable, wherein said input light pulse travels into said fiber optic cable and generates a reflection signal that includes at least one reflection of said input light pulse in said fiber optic cable;

c) receiving said reflection signal at said first end of said fiber optic cable; and d) evaluating characteristic parameters of said reflection signal to determine therefrom an existence of a bleed air leak from said bleed air pipe by determining that said temperature condition exceeds, a prescribed temperature limit, and to determine therefrom a location of said bleed air leak along said fiber optic cable which extends along said bleed air pipe;

wherein:
said reflection signal includes a temperature-dependent reflection pulse that arises at said location along said fiber optic cable when said location is subjected to said elevated temperature due to said bleed air leak,
said characteristic parameters of said reflection signal comprise an amplitude and a reflection transit time of said temperature-dependent reflection pulse,
said step of evaluating said characteristic parameters comprises evaluating said amplitude to determine said existence of said bleed air leak and evaluating said reflection transit time to determine said location of said bleed air leak along said fiber optic cable,
said step of evaluating said characteristic parameters comprises comparing said reflection signal to a prescribed comparative signal that does not include said temperature-dependent reflection pulse; and
further comprising a preliminary calibration step that comprises introducing a calibration light pulse into said first end of said fiber optic cable to generate a calibration reflection signal including at least a Fresnel reflection of said calibration light pulse at a second end of said fiber optic cable opposite said first end, and that further comprises receiving said calibration reflection signal at said first end of said fiber optic cable and using said calibration reflection signal as said prescribed comparative signal.

6. The method according to claim 5, wherein said step of evaluating said amplitude comprises comparing said amplitude to an amplitude threshold corresponding to said prescribed temperature limit.

7. The method according to claim 6, further comprising changing said amplitude threshold to correspond to a different temperature limit.

8. The method according to claim 5, wherein said evaluating of said reflection transit time comprises calculating from said reflection transit time a distance along said fiber optic cable to said location of said bleed air leak.

9. The method according to claim 5, wherein:
said sensor includes plural sensor zones along said fiber optic cable,
said prescribed temperature limit comprises plural different temperature limit values respectively individually allocated to said plural sensor zones, and
said step of evaluating said characteristic parameters of said reflection signal comprises evaluating at least one of said characteristic parameters relative to a respective one of said plural different temperature limit values that is allocated to a respective one of said sensor zones in which said location of said bleed air leak falls.

10. The method according to claim 5, further comprising successively repeating respective cycles of said steps b), c) and d), and further determining a time duration of said elevated temperature.

11. The method according to claim 5, further comprising successively repeating respective cycles of said steps b), c) and d), and further determining a temperature variation profile of said elevated temperature over a plurality of said cycles.

12. The method according to claim 5, wherein said reflection signal includes an end reflection pulse of a reflection of said input light pulse at a location of its furthest travel in said fiber optic cable, and further comprising detecting the occurrence of damage of said fiber optic cable by evaluating a reflection transit time of said end reflection pulse.

13. The method according to claim 5, further comprising introducing a second input light pulse into a second end of said fiber optic cable opposite said first end, receiving at said second end of said fiber optic cable a second reflection signal arising from at least one reflection of said second input light pulse, and evaluating characteristic parameters of said second input light pulse.

14. The method according to claim 5, wherein said comparative signal and said reflection signal each respectively further include a main internal reflection pulse of said input light pulse reflected in said fiber optic cable and a terminal end reflection pulse of said input light pulse reflected at a second end of said fiber optic cable opposite said first end.

15. The method according to claim 14, further comprising evaluating a terminal end reflection pulse transit time of said terminal end reflection pulse to determine therefrom a total length of said fiber optic cable.

16. A method of detecting and locating a bleed air leak from a bleed air pipe in a hot engine bleed air system in an aircraft, using a temperature sensor including a fiber optic cable extending along said bleed air pipe, said method comprising the following steps:

a) subjecting said fiber optic cable to a temperature condition existing along said bleed air pipe, in which said temperature condition exhibits an elevated temperature if bleed air leaks from said bleed air pipe;

b) introducing an input light pulse into a first end of said fiber optic cable, wherein said input light pulse travels into said fiber optic cable and generates a reflection signal that includes at least one reflection of said input light pulse in said fiber optic cable;

c) receiving said reflection signal at said first end of said fiber optic cable; and d) evaluating characteristic parameters of said reflection signal to determine therefrom an existence of a bleed air leak from said bleed air pipe by determining that said temperature condition exceeds a prescribed temperature limit, and to determine therefrom a location of said bleed air leak along said fiber optic cable which extends along said bleed air pipe;

wherein:
said reflection signal includes a temperature-dependent reflection pulse that arises at said location along said fiber optic cable when said location is subjected to said elevated temperature due to said bleed air leak,
said characteristic parameters of said reflection signal comprise an amplitude and a reflection transit time of said temperature-dependent reflection pulse,
said step of evaluating said characteristic parameters comprises evaluating said amplitude to determine said existence of said bleed air leak and evaluating said reflection transit time to determine said location of said bleed air leak along said fiber optic cable,
said sensor includes plural sensor zones along said fiber optic cable, said prescribed temperature limit comprises plural different temperature limit values respectively individually allocated to said plural sensor zones, said sensor zones are respectively associated individually with transit time ranges, said plural different temperature limit values are respectively associated individually with amplitude limits, said step of evaluating said reflection transit time comprises determining into which one of said transit time ranges said reflection transit time falls, and said step of evaluating said amplitude comprises comparing said amplitude to a respective one of said amplitude limits that is associated with the one of said temperature limit values allocated to the one of said sensor zones that is associated with said one of said transit time ranges into which said reflection transit time falls.

17. The method according to claim 16, wherein said step of evaluating said characteristic parameters further comprises determining a temperature level of said temperature condition at said location along said fiber optic cable from said evaluating of said amplitude.

18. The method according to claim 16, wherein said step of evaluating said characteristic parameters comprises comparing said reflection signal to a prescribed comparative signal that does not include said temperature-dependent reflection pulse.

19. The method according to claim 18, wherein said comparative signal and said reflection signal each respectively further include a main internal reflection pulse of said input light pulse reflected in said fiber optic cable and a terminal end reflection pulse of said input light pulse reflected at a second end of said fiber optic cable opposite said first end.

20. The method according to claim 19, further comprising evaluating a terminal end reflection pulse transit time of said terminal end reflection pulse to determine therefrom a total length of said fiber optic cable.

21. The method according to claim 18, further comprising a preliminary calibration step that comprises introducing a calibration light pulse into said first end of said fiber optic cable to generate a calibration reflection signal including at least a Fresnel reflection of said calibration light pulse at a second end of said fiber optic cable opposite said first end, and that further comprises receiving said calibration reflection signal at said first end of said fiber optic cable and using said calibration reflection signal as said prescribed comparative signal.

22. The method according to claim 16, further comprising successively repeating respective cycles of said steps b), c) and d), and further determining a time duration of said elevated temperature.

23. The method according to claim 16, further comprising successively repeating respective cycles of said steps b), c) and d), and further determining a temperature variation profile of said elevated temperature over a plurality of said cycles.

24. The method according to claim 16, wherein said reflection signal includes an end reflection pulse of a reflection of said input light pulse at a location of its furthest travel in said fiber optic cable, and further comprising detecting the occurrence of damage of said fiber optic cable by evaluating a reflection transit time of said end reflection pulse.

25. The method according to claim 16, further comprising introducing a second input light pulse into a second end of said fiber optic cable opposite said first end, receiving at said second end of said fiber optic cable a second reflection signal arising from at least one reflection of said second input light pulse, and evaluating characteristic parameters of said second input light pulse.

* * * * *

UNITED STATES PATENT AND TRADEMARK OFFICE
CERTIFICATE OF CORRECTION

PATENT NO. : 6,881,948 B2
DATED : April 19, 2005
INVENTOR(S) : Dammann

It is certified that error appears in the above-identified patent and that said Letters Patent is hereby corrected as shown below:

Title page,
Item [57], ABSTRACT, delete and replace the ABSTRACT to read as follows:
-- A fiber optic cable forms a temperature sensor arranged along an object or space, especially along a hot bleed air pipe in an aircraft, to monitor the temperature thereof and detect leakage or overheating conditions. An end of the sensor is connected to a laser emitter and an optical receiver, which are further connected to a computer that controls the emitter to emit a laser pulse into the sensor. The receiver receives the resulting reflection signal from the sensor, and provides a signal to the computer to be evaluated against a nominal comparison signal. If any location of the sensor is subjected to an unacceptable temperature increase, the sensor's refractive characteristics are changed, to cause an additional reflection pulse in the reflection signal. By evaluating the amplitude and the return time of the additional reflection pulse, the computer determines the temperature and the location of the overheating condition. --.

Column 3,
Line 16, after "reflection", delete "1,";
Line 29, before "crew" insert -- flight --;

Column 4,
Line 61, after "receiver", insert -- 7 --;

Column 7,
Line 13, after "computer", insert -- 1 --;
Line 24, after "pulse", insert -- $I_4$ --;
Line 32, after "pulse", replace "17" by -- $I_7$, --;
Line 33, after "pulse", replace "16" by -- $I_6$ --;
Lines 34 and 39, after "pulse", replace "17" by -- $I_7$ --;

Column 8,
Line 29, after "plural", replace "sensors" by -- sensor --;

UNITED STATES PATENT AND TRADEMARK OFFICE
CERTIFICATE OF CORRECTION

PATENT NO. : 6,881,948 B2
DATED : April 19, 2005
INVENTOR(S) : Dammann

It is certified that error appears in the above-identified patent and that said Letters Patent is hereby corrected as shown below:

Column 9,
Line 9, after "exceeds", delete ",".

Signed and Sealed this

Eleventh Day of October, 2005

JON W. DUDAS
*Director of the United States Patent and Trademark Office*